(12) United States Patent
Methling et al.

(10) Patent No.: US 6,256,363 B1
(45) Date of Patent: Jul. 3, 2001

(54) STORAGE/TRANSPORT CONTAINER FOR SPENT NUCLEAR-FUEL ELEMENTS

(75) Inventors: Dieter Methling, Hattingen; Harry Spilker, Bad Münder, both of (DE)

(73) Assignee: GNB Gesellschaft fur Nuklear-Behalter mbH, Essen (DE)

( * ) Notice: Subject to any disclaimer, the term of this patent is extended or adjusted under 35 U.S.C. 154(b) by 0 days.

(21) Appl. No.: 09/550,742

(22) Filed: Apr. 17, 2000

(30) Foreign Application Priority Data

Apr. 17, 1999 (DE) .............................................. 199 17 515

(51) Int. Cl.⁷ .................................................. G21C 19/40
(52) U.S. Cl. ......................................... 376/272; 250/507.1
(58) Field of Search ........................ 376/272; 250/507.1, 250/506.1

(56) References Cited

U.S. PATENT DOCUMENTS

| | | | |
|---|---|---|---|
| 4,666,659 | * | 5/1987 | Lusk et al. ............................. 376/272 |
| 4,711,758 | * | 12/1987 | Machado et al. ...................... 376/272 |
| 4,827,139 | * | 5/1989 | Wells et al. ............................ 376/272 |
| 4,868,400 | * | 9/1989 | Barnhardt et al. ..................... 376/272 |
| 5,032,348 | | 7/1991 | Blum ...................................... 376/272 |
| 5,063,299 | * | 11/1991 | Efferding ............................... 376/272 |

* cited by examiner

*Primary Examiner*—Harvey E. Behrend
(74) *Attorney, Agent, or Firm*—Herbert Dubno; Andrew Wilford

(57) ABSTRACT

A transport/storage container for spent nuclear-fuel elements has a vessel having a side wall with an inner surface defining an interior extending along an axis and a plurality of like basket sections forming a stack extending substantially a full axial length of the interior and forming a plurality of axial full-length rectangular-section wells adapted to receive the spent fuel elements. Each of the basket sections is formed of two long light-metal neutron-absorbing plates crossing each other, each having a pair of outer ends directly engaging the inner surface of the side wall in heat-transmitting contact therewith, and subdividing the interior at the respective section into a plurality of segments. A plurality of short light-metal neutron absorbing plates are fitted together in each of the segments and form with the main plates of the respective section rectangular-section axially throughgoing openings forming the wells with the plates of the other sections.

10 Claims, 2 Drawing Sheets

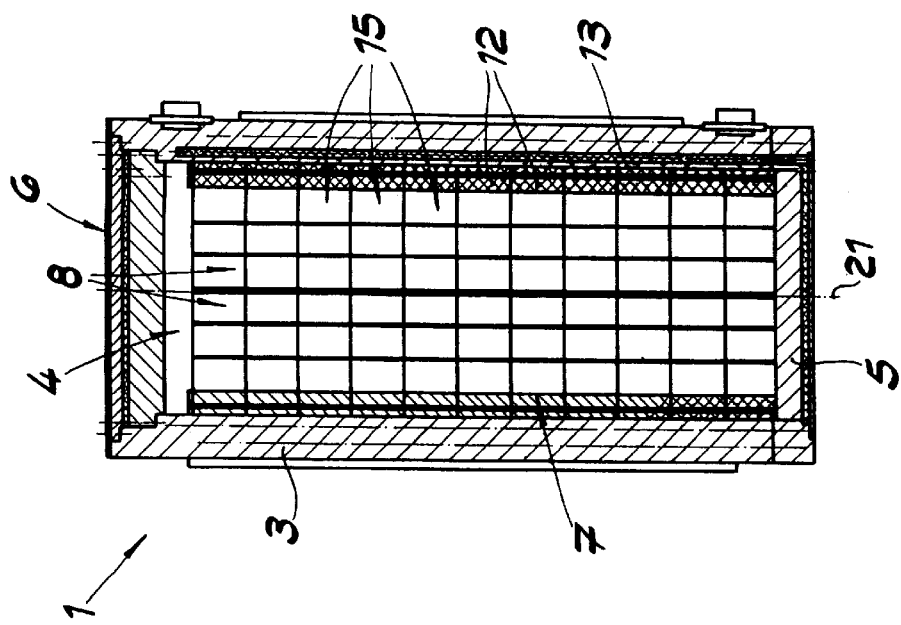
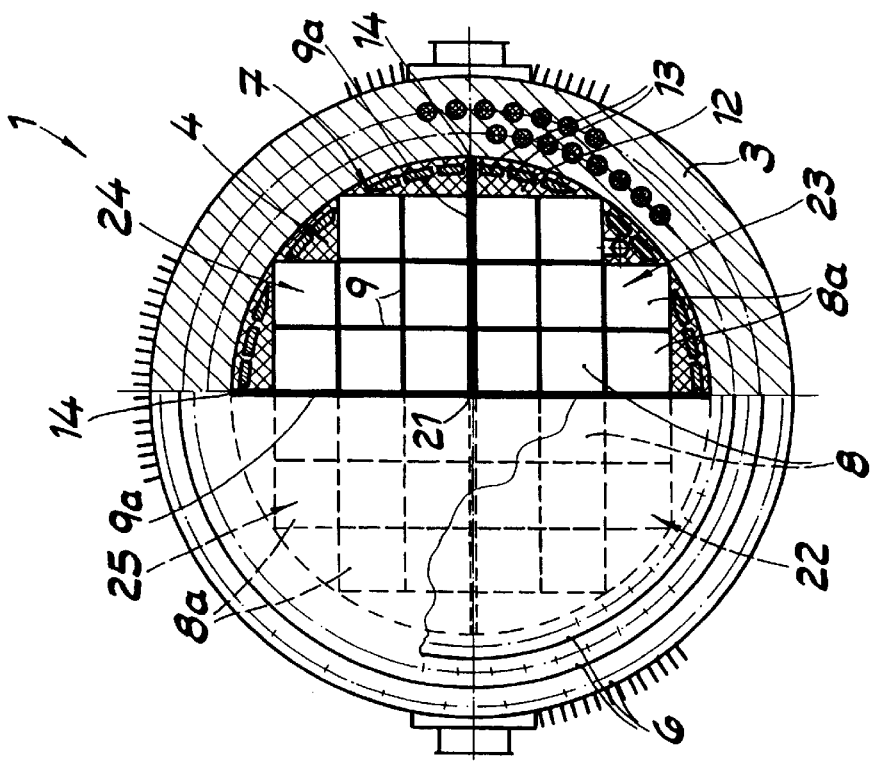

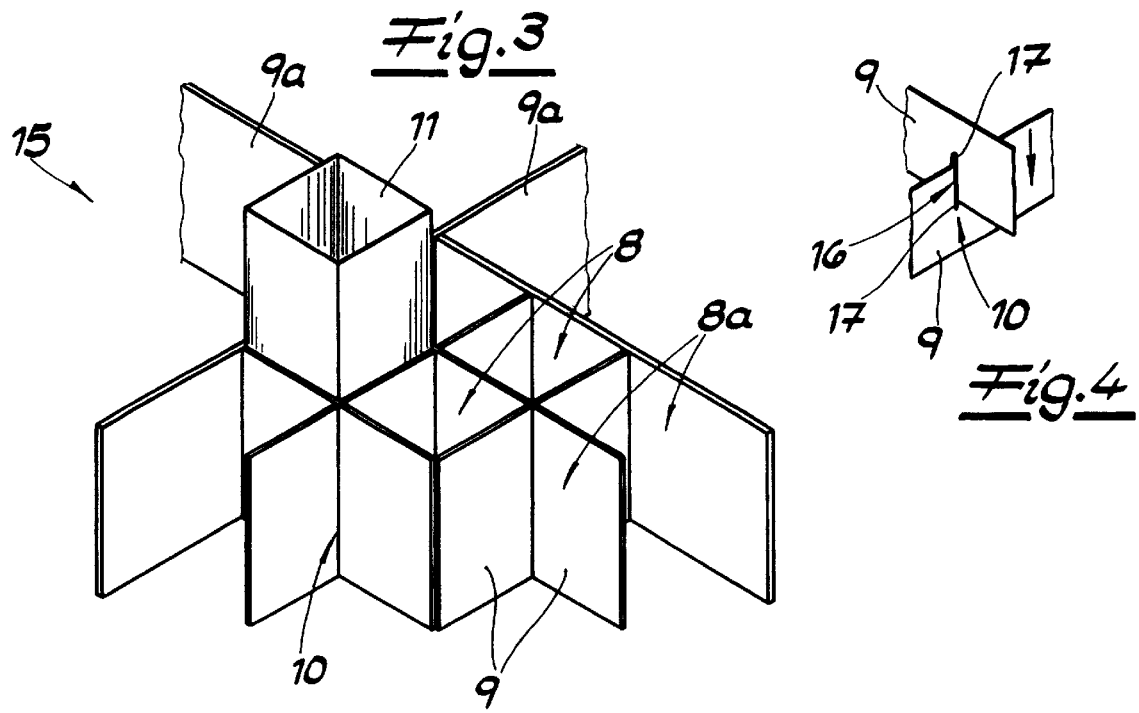
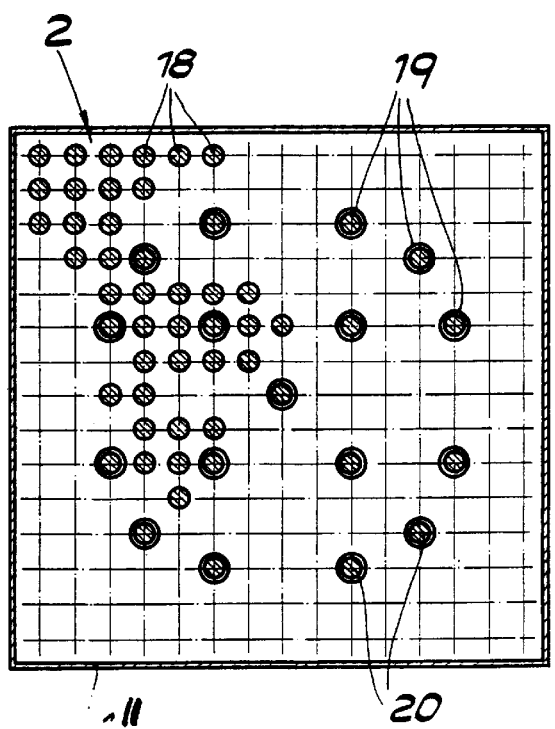

STORAGE/TRANSPORT CONTAINER FOR SPENT NUCLEAR-FUEL ELEMENTS

FIELD OF THE INVENTION

The present invention relates to a storage/transport container for spent nuclear-fuel elements. More particularly this invention concerns such a container used for spent fuel rods.

BACKGROUND OF THE INVENTION

A transport/storage container for spent nuclear-fuel elements typically has a vessel having a side wall with an inner surface defining an interior extending along an axis and a multilevel basket extending substantially a full axial length of the interior and forming a plurality of axial full-length rectangular-section wells adapted to receive the spent fuel elements. The lower end of the interior is closed by a permanent floor and the upper end by a massive but removable cover.

It is essential to maintain the rods held in such a container in a subcritical state. Thus their neutron emissions must be controlled. This is normally accomplished as described in U.S. Pat. No. 5,032,348 by forming each level of the basket of a plurality of fitted-together plates. Each set of plates forms a plurality of openings that together form the wells that receive the spent fuel rods. All the plates fit together at slot joints at the corners of all the wells. The neutron-absorbing plates are normally of a relative poor thermal capacity so it is necessary to alternate layers made of plates of neutron-absorbing material with layers made of plates of a more thermally conductive material so that the heat generated in such a container can be conducted to the side walls.

Such a system therefore trades dissipating heat off against suppressing neutron emissions. One function can only be made better by making the other worse. In addition fitting together the numerous plates making up each level is an onerous task, involving meticulously fitting together long plates simultaneously at multiple joints so that the container is expensive to manufacture of a large number of pieces of different sizes.

In another system borated-steel plates form the baskets. Plates of this material must be welded or screwed together, as the slot joint described above is not usable because of the brittleness of borated steel. Thus assembly of the basket becomes extremely expensive since it is too complex to automate, even with welding which is the preferred and cheaper solution. Furthermore the container is extremely heavy when its basket is made of steel.

It is further known for some of the wells in a borated-steel basket to be water filled, acting as neutron traps. Such use of water makes the container quite large and of course also increases its weight, while making the gaps necessary for flow of the water increases the cost of the plates. Furthermore using some of the wells for water only reduces the number of wells usable for fuel rods, reducing the capacity of the container. The basket furthermore is not particularly strong and has difficulty meeting requirements in this regard, as the basket must keep the fuel rods apart even if dropped or otherwise subjected to some serious axial and/or radial stress. Finally, such a system is difficult to decontaminate.

OBJECTS OF THE INVENTION

It is therefore an object of the present invention to provide an improved container for spent nuclear-fuel rods.

Another object is the provision of such an improved container for spent nuclear-fuel rods which overcomes the above-given disadvantages, that is which is of inexpensive and light construction and considerable neutron-absorbing capacity yet which has a high load capacity and is easy to decontaminate.

SUMMARY OF THE INVENTION

A transport/storage container for spent nuclear-fuel elements has according to the invention a vessel having a side wall with an inner surface defining an interior extending along an axis and a plurality of like basket sections forming a stack extending substantially a full axial length of the interior and forming a plurality of axial full-length rectangular-section wells adapted to receive the spent fuel elements. Each of the basket sections is formed of two long light-metal neutron-absorbing plates crossing each other, each having a pair of outer ends directly engaging the inner surface of the side wall in heat-transmitting contact therewith, and subdividing the interior at the respective section into a plurality of segments. A plurality of short light-metal neutron absorbing plates are fitted together in each of the segments and form with the main plates of the respective section rectangular-section axially throughgoing openings forming the wells with the plates of the other sections.

The short plates are not actually connected to the long plates. Thus these long plates can fulfill the heat-conducting function that is preferred at each level. In addition the use of interfitted short plates in each segment of each level means that these short plates are easily assembled together. In a standard system with eight wells per segment there will be at most two joints between any short plate and the other plates. Such a system is still as strong as needed, even though the short plates are not actually joined to the long plates. The wells are normally defined on at least two sides by the plates and, toward the center of the container they are defined on all four sides by the plates.

For maximum strength and lightness the plates are made of a borated light metal, preferably aluminum or an aluminum alloy. Normally the plates are all of the same material, since the long plates will also work effectively to conduct heat to the wall of the container. Preferably according to the invention the long plates are thicker than the short plates for best heat conduction and strength. More particularly the long plates are between 9 mm and 15 mm, preferably 11 mm and 13 mm, thick. The short plates are between 6 mm and 10 mm, preferably 7 mm and 9 mm, thick. With a system having 32 wells, only two different lengths of short plates are needed, plates having a length equal to twice the width of a well, and plates with three times that width.

In accordance with the invention the inner surface is generally cylindrical and centered on the axis. The long plates are perpendicular to each other and subdividing the interior at the respective level into four quadrants. In addition at least one respective filler block is provided in each of the quadrants. The blocks each have a curved outer surface complementarily engaging the inner surface at the respective level and at least one planar inner surface forming walls of respective openings. Furthermore each filler block is provided with shielding. These blocks can be made of cast borated aluminum with lead bodies imbedded in them.

Furthermore the plates each have upper and lower edges which, except for at the bottom and top levels, engage lower and upper edges of the overlying and underlying plates. The wells therefore basically continuous side walls so that any neutrons will be intercepted. Ends of the short plates bear in heat-transmitting relationship on the main plates and on the filler blocks so that, even though these short plates are normally somewhat thinner than the long plates, they also transmit heat effectively. There is no actual connection of the short plates to the long plates, for instance by means of half-width joint slots; at most the short plates bear longitudinally on the main plates. Thus these filler blocks, which have the same axial dimension as the plates, have three functions: conducting heat away from the contained rods to the container walls, blocking neutrons, and transversely bracing the basket sections and tubes in the container.

According to the invention a respective light-metal tube extends substantially the full length of each of the wells. The spent nuclear-fuel elements are within the light-metal tubes. These tubes are each provided with axial guide passages and is provided therein with neutron-absorbing rods. Each tube is of the same square or rectangular section as the respective well and fits tightly therein so that these tubes considerably rigidify the system, holding the basket sections in accurate axial alignment with one another. These tubes can be of stainless steel.

The long plates are in accordance with the invention formed with interfitting half-width joint slots. The short plates are similarly joined to one another, but not to the main plates. The elimination of welding considerably reduces the cost of manufacturing the container. The system is thus normally built level-by-level, fitting all the plates and filler blocks for one level together in the container before starting the next level. This modular construction allows the same basic parts to be used in containers of different axial dimensions. Once all the basket sections are in place, the stainless-steel tubes are installed to lock everything together.

Such a container can be quite strong and still relatively light. It is cheap and easy to assembly, and none of its parts require complex manufacture or machining. The combination of the stiffening tubes and the basket sections together produces an extremely rigid assembly. The container of this invention has a higher load capacity, that is the ability to hold more fuel rods, than the above-discussed prior-art systems. It is possible to eliminate the need for water passages between adjacent basket sections with the highly efficient and shielded system of this invention. The elimination of borated steel greatly reduces the cost and weight of the system. Only three different plates are needed, one type of long plate and two lengths of short plate, so construction costs can be reduced considerably. Similarly two types of filler blocks are all that are needed, ones with one flat side that closes two adjacent wells and another with two separate flat sides that close sides of two adjacent wells.

BRIEF DESCRIPTION OF THE DRAWING

The above and other objects, features, and advantages will become more readily apparent from the following description, reference being made to the accompanying drawing in which:

FIG. 1 is a top view partly in horizontal section through a container according to the invention;

FIG. 2 is a vertical section through the container;

FIG. 3 is a large-scale perspective view illustrating a detail of the container;

FIG. 4 is a perspective view illustrating assembly of the structure of FIG. 3; and FIG. 5 is a cross section through a pack of fuel elements.

SPECIFIC DESCRIPTION

As seen in FIGS. 1 and 2 a container 1 for spent nuclear fuel elements 2 (FIG. 5) has a massive and cylindrical side or outer wall 3 centered on a normally upright axis 21 and defining an interior 4. A floor plate 5 closes the bottom of the wall 3 and a cover 6 the top. The walls 4, floor 5, and cover 6 can include shielding materials, for instance steel with polyethylene shielding. A rack or basket 7 forming a plurality (here 32) of axially full length wells or passages 8 and 8a is itself formed as a stack of levels 15 each formed in turn by neutron-absorbing borated aluminum plates 9 and 9a joined together at slide joints 10 (FIG. 4). Snugly fitted in each of the wells or passages 8 and 8a is a square-section stainless-steel tube 11 holding the elements 2 and extending the full axial length of the interior 4 of the container 1.

The plates 9a each extend diametrally between outer ends 14 that bear against an inner surface of the side wall 3 so as to be in good heat-transmitting contact therewith. These plates 9a, which are some 12 mm thick, subdivide the interior 4 at each level 15 into four quadrants 22, 23, 24, and 25. The plates 9 are some 8 mm thick and have lengths equal to two or three times the side length of the identical square-section wells 8 and 8a. They fit together at joints 16 where they are formed with half-width slots 17 that fit together to form the inner wells 8 that are wholly defined by the plate 9 and 9a and identical outer wells 8a of which at most two or three sides are formed by the plates 9 and 9a.

Around the rack 7 the container 1 is provided with filler blocks 12 each made of cast aluminum in which are imbedded lead shield elements 13. Each block 12 has a part-cylindrical outer surface and an inner surface formed as one or two planar sides, so that together with the rack 7 they form the outer walls of the outer wells 8a.

The rack 7 is assembled right in the side wall 3 one level 15 at a time, each level 15 being formed by two plates 9a, eight short plates 9, eight long plates 9a, and twelve filler blocks 12. Once complete, the square-section element-filled tubes 11 are slipped into place. As shown in FIG. 5 each such tube 11 carries a multiplicity of spent fuel rods 18 and is formed with an array of guide passages or tubes 19, here lying in a uniform array, each holding a respective absorber rod 20 to maintain the charge subcritical.

We claim:

1. A transport/storage container for spent nuclear-fuel elements, the container comprising:

a vessel having a side wall with an inner surface defining an interior extending along an axis; and a plurality of like basket sections forming a stack extending substantially a full axial length of the interior and forming a plurality of axial full-length rectangular-section wells adapted to receive the spent fuel elements, each of the basket sections being formed of:

two long light-metal neutron-absorbing plates crossing each other, each having a pair of outer ends directly engaging the inner surface of the side wall in heat-transmitting contact there-with, and subdividing the interior at the respective section into a plurality of segments, and a plurality of short light-metal neutron absorbing plates in each of the segments, fitted together and forming with the main plates of the respective section rectangular-section axially throughgoing openings forming the wells with the plates of the other sections.

2. The fuel-element transport/storage container defined in claim 1 wherein the plates are made of borated aluminum.

3. The fuel-element transport/storage container defined in claim 1 wherein the long plates are thicker than the short plates.

4. The fuel-element transport/storage container defined in claim 1 wherein the inner surface is generally cylindrical and centered on the axis, the long plates being perpendicular to each other and subdividing the interior at the respective level into four quadrants.

5. The fuel-element transport/storage container defined in claim 4, further comprising
at least one respective filler block in each of the quadrants having a curved outer surface complementarily engaging the inner surface at the respective level and planar inner surfaces forming walls of respective openings.

6. The fuel-element transport/storage container defined in claim 5 wherein each filler block is provided with shielding.

7. The fuel-element transport/storage container defined in claim 1, further comprising
a respective metal tube extending substantially the full length of each of the wells, the spent nuclear-fuel elements being within the metal tubes.

8. The fuel-element transport/storage container defined in claim 7 wherein the tube is provided with axial guide passages and is provided therein with neutron-absorbing rods.

9. The fuel-element transport/storage container defined in claim 1 wherein the long plates are formed with interfitting half-width joint slots.

10. A transport/storage container for spent nuclear-fuel elements, the container comprising:
a vessel having a side wall with an inner surface defining an interior extending along an axis;
a plurality of like basket sections forming a stack extending substantially a full axial length of the interior and forming a plurality of axial full-length rectangular-section wells adapted to receive the spent fuel elements, each of the basket sections being formed of:
two long light-metal neutron-absorbing plates crossing each other, each having a pair of outer ends directly engaging the inner surface of the side wall in heat-transmitting contact there-with, and subdividing the interior at the respective section into a plurality of segments, and
a plurality of short light-metal neutron absorbing plates in each of the segments, fitted together and forming with the main plates of the respective section rectangular-section axially throughgoing openings forming the wells with the plates of the other sections;
at least one respective filler block in each of the quadrants having a curved outer surface complementarily engaging the inner surface at the respective level and planar inner surfaces forming walls of respective openings; and;
a respective metal tube fitting complementarily snugly in and extending substantially the full axial length of each of the wells, the spent nuclear-fuel elements being within the metal tubes.

* * * * *